(12) United States Patent
Okuyama

(10) Patent No.: US 6,926,395 B2
(45) Date of Patent: Aug. 9, 2005

(54) INK TUBE FOR INK JET PRINTER

(75) Inventor: Hideyuki Okuyama, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 66 days.

(21) Appl. No.: 10/692,789

(22) Filed: Oct. 27, 2003

(65) Prior Publication Data

US 2004/0134554 A1 Jul. 15, 2004

(30) Foreign Application Priority Data

Oct. 28, 2002 (JP) .................................... 2002-312162

(51) Int. Cl.$^7$ .................................................. B41J 2/17
(52) U.S. Cl. ........................................... 347/84; 347/85
(58) Field of Search .................................. 347/84–87

(56) References Cited

U.S. PATENT DOCUMENTS 4,689,641 A * 8/1987 Scardovi et al. ............... 347/68
6,557,987 B1 * 5/2003 Mello et al. .................... 347/84
6,726,314 B2 * 4/2004 Van Roy ....................... 347/85

FOREIGN PATENT DOCUMENTS

JP 10-29317 A 2/1998 ............ B41J/2/175

* cited by examiner

Primary Examiner—Juanita D. Stephens
(74) Attorney, Agent, or Firm—Birch, Stewart, Kolasch & Birch, LLP

(57) ABSTRACT

An ink tube (10) for an ink jet printer is formed by using a thermoplastic elastomer composition, having a Shore-A-hardness of not more than 70, which comprises an olefin thermoplastic resin and a rubber component, containing not less than 30 wt % of butyl rubber, which is dispersed finely by dynamic vulcanization the rubber component in the olefin thermoplastic resin. It is preferable to extrude the thermoplastic elastomer composition tubularly by a resin extrusion method.

13 Claims, 1 Drawing Sheet

INK TUBE FOR INK JET PRINTER

This nonprovisional application claims priority under 35 U.S.C. § 119(a) on Patent Application No. 2002-312162 filed in JAPAN on Oct. 28, 2002, which is herein incorporated by reference.

BACKGROUND OF THE INVENTION

1. Field of the Invention

The present invention relates to an ink tube for an ink jet printer. More particularly, the present invention relates to an ink tube that is used to discard waste ink to the outside of an ink head, when the ink head of the ink jet printer is cleaned and used to supply ink from an ink tank to the ink head.

2. Description of the Related Art

In the ink jet printer, the ink head is connected with the ink tube necessary for feeding the ink. The ink tube is used to discard the waste ink to the outside of the ink head, when the ink head of the ink jet printer is cleaned and used to supply the ink from the ink tank to the ink head.

The liquid ink printer using the ink tube disclosed in Japanese Patent Application Laid-Open No. 10-29317 has a liquid ink printing head and an ink circulation device.

To discharge the ink from the ink tube, the ink tube is squeezed. Thus the ink tube is demanded to return to its original state when it is pressed and deformed. That is, the ink tube is demanded to be flexible. In dependence on a construction inside the printer, it is necessary to dispose the ink tube by bending it along other members. Thus if the ink tube has a low degree of flexibility, the ink does not flow smoothly. Thus it is conventional to make the ink tube of vulcanized silicone rubber, fluorine rubber, EPDM or the like capable of realizing rubberlike elasticity.

The ink tube is also demanded to have low water vapor permeability and air permeability. That is, when the ink tube has a low water vapor permeability, vaporized water of the ink inside the ink tube does not permeate the ink tube. Thereby the ink can be prevented from being set. Thus it is possible to allow the ink tube to keep its performance for a long time. If the ink tube has a low air permeability, oxygen or the like present outside the ink tube does not permeate the ink tube. Thus it is possible to prevent the ink inside the ink tube from being deteriorated by oxidization.

It is difficult to allow the ink tube made of the vulcanized rubber to have low water vapor permeability and air permeability and at the same time a high degree of flexibility. The ink tube made of the vulcanized rubber is also demanded to have high processability and productivity to reduce the cost for producing it.

SUMMARY OF THE INVENTION

The present invention has been made in view of the above-described problems. Therefore it is an object of the present invention to provide an ink tube, for an ink jet printer, having a high degree of flexibility and low degree of water vapor permeability and air permeability.

To solve the above-described problems, there is provided an ink tube for an ink jet printer formed by using a thermoplastic elastomer composition, having a Shore-A-hardness of not more than 70, which comprises an olefin thermoplastic resin and a rubber component, containing not less than 30 wt % of butyl rubber, which is dispersed finely by dynamic vulcanization the rubber component in the olefin thermoplastic resin.

The ink tube is formed by using the thermoplastic elastomer composition containing the rubber component finely dispersed in the olefin thermoplastic resin by dynamic vulcanization the rubber component. The rubber component contains not less than 30 wt % of the butyl rubber having low water vapor permeability and air permeability. Therefore it is possible to set the water vapor permeability and the air permeability of the thermoplastic elastomer composition to a low degree, obtain rubberlike durability, elasticity, and flexibility, and resinlike processability and moldability. It is also possible to set the Shore-A-hardness of the thermoplastic elastomer composition to a low degree, namely, not more than 70. Thus the ink tube for the ink jet printer of the present invention has high flexibility and low water vapor permeability and air permeability.

The reason the rubber component contains not less than 30 wt % of the butyl rubber is as follows: If the rubber component contains less than 30 wt % of the butyl rubber, it is impossible to reduce the water vapor permeability and the air permeability of the ink tube. Further there occurs a problem that the water of ink vaporizes and enters into the ink tube. Thereby the ink is set. Another problem is that oxygen or the like present outside the ink tube permeates the ink tube, thus deteriorating oxidizing the ink inside the ink tube by oxidization. The olefin thermoplastic resin is used as the matrix resin to make the material for the ink tube thermoplastic. The thermoplastic material can be extruded successively at a high speed unlike a material consisting of rubber. Thus it is possible to produce the ink tube at a high efficiency and a low cost.

The reason the Shore-A-hardness is set to not more than 70 is as follows: If the Shore-A-hardness of the ink tube is more than 70, the ink tube is not sufficiently flexible. Consequently the ink tube makes the flow of the ink unsmooth because it is liable to bend during use. Further the ink tube adversely affects the strength of a joint connected with the ink tube when the printer operates.

It is more favorable to set the Shore-A-hardness to not less than 40 nor more than 60. The lower the hardness of the ink tube is, the more flexible it is. However, if the Shore-A-hardness is too low, the ink tube is liable to pull out.

It is preferable that the thermoplastic elastomer composition is shaped a tube by a resin extrusion method. Thereby it is possible to allow the extruded thermoplastic elastomer composition to have smooth surface, high processability, and moldability. Further the production speed of the thermoplastic elastomer composition higher speed than that of vulcanized rubber. That is, the resin extrusion method improves the productivity of the thermoplastic elastomer composition. In addition, it is possible to adopt an injection molding method.

It is favorable that the weight ratio between the thermoplastic elastomer composition and the rubber component is 4:1 to 1:4. Thereby the rubber component can be efficiently, uniformly, and finely dispersed in the olefin thermoplastic resin. If the weight ratio of the rubber component is more than the above-described range, it is difficult to obtain preferable moldability. On the other hand, if the weight ratio of the rubber component is less than the above-described range, it is difficult to obtain preferable flexibility. It is more favorable that the weight ratio between the olefin thermoplastic resin and the butyl rubber is 2:1 to 1:2. It is particularly favorable that the weight ratio between the olefin thermoplastic resin and the butyl rubber is 1:2 to 1:1.

It is favorable that the water vapor permeability of the ink tube is not more than 1.0 ($g \cdot mm/m^2 \cdot day$) at 37.8° C. and 90% RH. Thereby it is possible to prevent vaporization of water contained in the ink flowing inside the ink tube and prevent the ink from being set owing to the vaporization of the water. That is, it is possible to prevent the ink tube from being clogged with the ink.

It is more favorable that the water vapor permeability of the ink tube is not more than 0.8 (g·mm/m$^2$·day) at 37.8° C. and 90% RH. The lower the water vapor permeability, the more favorable.

It is favorable that the air permeability of the ink tube is not more than 100 (g·mm/m$^2$·day·atm) at 23° C. Thereby it is possible to prevent the ink from deteriorating because very little oxygen or the like present outside the ink tube permeates the ink tube.

The air permeability of the ink tube is more favorably not more than 80 (g·mm/m$^2$·day·atm) at 23° C. and most favorably not more than 60 (g·mm/m$^2$·day·atm) at 23° C.

It is favorable that butyl rubber is used singly or a mixture of the butyl rubber and EPDM (ethylene propylene diene rubber) is used as the rubber component.

To increase the water vapor permeability and the air permeability, it is preferable that the rubber component consists of the butyl rubber. To reduce the flexibility and the compression set of the thermoplastic elastomer composition to a higher extent, it is possible to use a mixture of the butyl rubber and other rubber components. In this case, it is preferable to set the content of the butyl rubber in the rubber component to not less than 40 wt % nor more than 80 wt %. It is preferable to mix the EPDM with the butyl rubber so that the ink tube may satisfy demanded performance and the rubber component to be mixed with the butyl rubber may be compatible favorably with the butyl rubber. The EPDM of both oil-extended type and oil-unextended type can be used.

As the rubber components other than the butyl rubber, the following rubbers compatible with the butyl rubber can be preferably used: natural rubber (NR), isoprene rubber (IR), butadiene rubber (BR), styrene-butadiene rubber (SBR), chloroprene rubber (CR), 1,2-polybutadiene rubber, and acrylonitrile-butadiene rubber (NBR). These rubbers can be used singly or as a mixture of two or more thereof.

It is preferable that as the olefin thermoplastic resin, one or more resins selected from among polypropylene (PP), polyethylene (PE), and the like are used. It is preferable that the thermoplastic elastomer composition contains an ethylene block because the ethylene block allows the rubber component to be readily dispersed in the olefin thermoplastic resin. Polypropylene is preferable because it provides flowability and a suitable degree of resistance to scuffing, has high processability, and is compatible with the butyl rubber and the EPDM.

In addition, the following olefin resins commercially available can be used: ethylene ethyl acrylate resin, ethylene vinyl acetate resin, ethylene methacrylate resin, and ionomer resin.

The value of the compression set of the thermoplastic elastomer composition is favorably not more than 50% and more favorably not more than 40%, when it is measured at 70° C. for 72 hours at a compression rate of 25%. If the compression set is more than 50%, a dimensional change of the thermoplastic elastomer composition is so large that it takes much time for the ink tube to return to its original state elastically. Further the end of the ink tube is liable to separate from a joint connected with the ink tube.

The thermoplastic elastomer composition contains a softener such as oil and a plasticizer favorably at not less than 5 nor more than 100 parts by weight and more favorably at not less than 20 nor more than 60 parts by weight for 100 parts by weight of the rubber component. Thereby it is possible to adjust the flexibility of the thermoplastic elastomer composition to a proper degree in balance with other properties thereof.

As the oil, it is possible to use known mineral oil such as paraffin oil, naphthenic oil, and aromatic series; and known synthetic oil such as oligomer of hydrocarbon series; and process oil. As the synthetic oil, it is possible to use oligomer of α-olefin, oligomer of butane, and amorphous oligomer of ethylene and α-olefin. As the plasticizer, it is possible to use dioctyl phthalate (DOP), dibutyl phthalate (DBP), dioctyl sebacate (DOS), and dioctyl adipate (DOA). When rubber of oil-extended type is used, the addition weight of the rubber is regarded as the addition weight (amount of oil) of the softener.

As the crosslinking agent which can be used in dynamically crosslink the rubber component, a crosslinking agent consisting of a peroxide or a resin is preferable because the crosslinking agent consisting of the peroxide or the resin does not bloom readily and makes the compression set of the thermoplastic elastomer composition low. Sulfur can be also used to dynamically crosslink the rubber component. The thermoplastic elastomer composition contains the crosslinking agent favorably at not less than 3 nor more than 20 parts by weight and more favorably at not less than 5 nor more than 15 parts by weight for 100 parts by weight of the rubber component.

As the phenolic resin agents, phenolic resin, melamine-formaldehyde resin, triazine formaldehyde condensate, hexametoxymethyl-melamine resin can be used. The phenolic resin is particularly favorable. As the phenolic resin, it is possible to use phenolic resins synthesized by reaction of phenols such as phenol, alkylphenol, cresol, xylenol, and resorcin with aldehydes such as formaldehyde, acetic aldehyde, and furfural. It is preferable to use alkylphenol-formaldehyde resin resulting from reaction of formaldehyde with alkylphenol having alkyl group connected to the ortho position or the para position of benzene, because the alkylphenol-formaldehyde resin is compatible with rubber and reactive, thus making a crosslinking reaction start time comparatively early.

According to the present invention, the dynamic crosslinking may be accomplished in the presence of halogen such as chloride, bromide, fluoride, and iodine. To allow the halogen to be present in the dynamic crosslinking reaction, a halogenated resinous crosslinking agent is used or a halogen donor is added to the elastomer composition. Above all, halogenated phenol resin is preferable. Halogenated alkylphenol formaldehyde resin is particularly favorable because it is compatible with the rubber and reactive and thus makes the start time of a crosslinking reaction comparatively early.

A crosslinking assistant (activator) may be used to accomplish the cross-liking reaction properly. Metal oxides are used as the crosslinking assistant. As the metal oxide, zinc oxide and zinc carbonate are preferable.

As the crosslinking agent consisting of peroxides, it is possible to use 2,5-dimethyl-2,5-di(t-butyl peroxy)hexyne-3;
dicumyl peroxide;
1,1-bis(t-butyl peroxy)3,3,5-trimethylcyclohexane;
2,5-dimethyl-2,5-di(t-butyl peroxy)hexane; benzoyl peroxide,
2,5-dimethyl-2,5-di(benzoyl-oxy)hexane;
di-t-butyl peroxy-m-di-isopropylbenzene; and
t-butyl peroxybenzoate; t-butyl peroxide; di-t-butyl peroxide.

These peroxides can be selectively used in dependence on the melting point and the softening point of the olefin thermoplastic resin and the stay period of time in a kneader.

To improve and adjust the mechanical properties of the thermoplastic elastomer composition such as the fatigue characteristic thereof and improve crosslinking density in crosslinking the rubber component with the peroxide, the following crosslinking assistants of polyfunctional monomers may be used: triallyl isocyanurate (TAIC), triallyl cyanurate (TAC), trimethylolpropane methacrylate (TMPT), ethylene glycol dimethacrylate (EDMA), and N-N'-m-phenylene-bismaleimide. As necessary, resin and sulfur may be used in combination with the peroxide in crosslinking the rubber component with the peroxide.

The thermoplastic elastomer composition may contain fillers and age resistors as necessary to improve the strength thereof.

Since the ink tube of the present invention has very low water vapor permeability and air permeability, the ink tube has only one layer and is capable of preventing the water of the ink inside the ink tube from permeating therethrough and oxygen or the like present outside the ink tube from permeating therethrough. As necessary, one or more layers may be formed on the inner peripheral surface or/and the peripheral surface of the ink tube. In addition, various kinds of surface treatments may be made. Conventional various kinds of inks for the ink jet printer are applicable to the ink tube of the present invention. The preferable thickness of the ink tube is in the range of 0.5 mm to 2.0 mm.

DETAILED DESCRIPTION OF THE PREFERRED EMBODIMENTS

Figure 1:
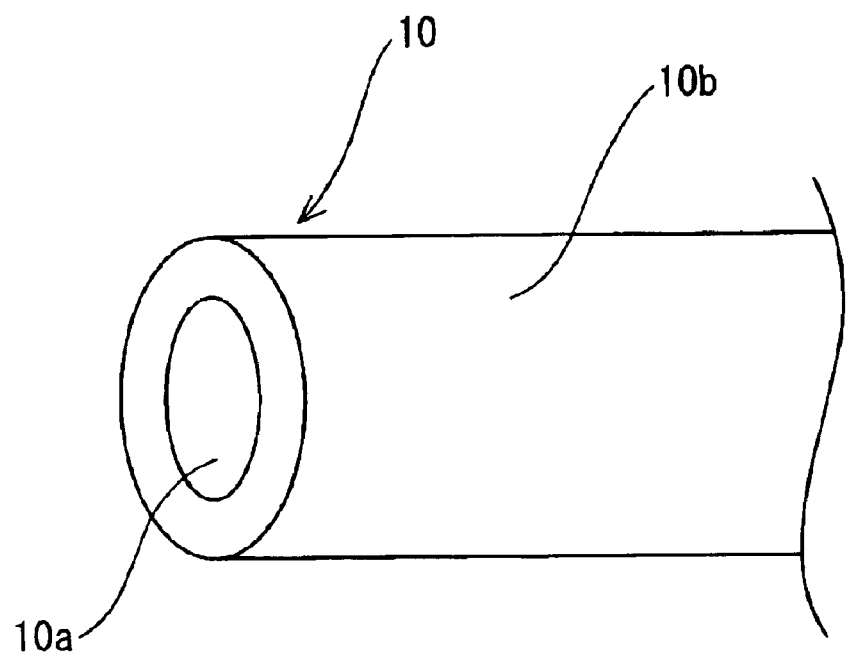
FIG. 1 is a schematic view showing an ink tube, for an ink jet printer, of the present invention.

The embodiments of the present invention will be described below with reference to drawings.

FIG. 1 shows an ink tube 10, for an ink jet printer, of the present invention (hereinafter referred to as merely ink tube). Ink flows in a hollow portion of the ink tube 10. The ink tube 10 is used with an inner peripheral surface 10a of the ink tube 10 in contact with the ink and with a peripheral surface 10b thereof in contact with air.

The ink tube 10 is formed by using a thermoplastic elastomer composition containing polypropylene used as an olefin thermoplastic resin and a rubber component, containing 100 wt % of butyl rubber, which is dispersed in the polypropylene uniformly and finely by dynamic vulcanization the rubber component with a crosslinking agent consisting of a resin. The thermoplastic elastomer composition has a Shore-A-hardness of 41.

More specifically, the thermoplastic elastomer composition contains 100 parts by weight of the butyl rubber, 80 parts by weight of the polypropylene, 12 parts by weight of the resinous crosslinking agent, and 50 parts by weight of oil used as a softener. After these components are mixed with one another, the mixture is kneaded and dynamical crosslinking is performed while it is being heated at a required temperature for a required time period. The obtained thermoplastic elastomer composition is pelletized.

The pelletized thermoplastic elastomer composition is extruded tubularly from a mono-axial extruder by a resin extrusion method. The extrusion temperature is set to 190° C. to 230° C. The extrusion speed is set to 2 m/minute to 10 m/minute.

The water vapor permeability of the ink tube 10 is set to 0.56 (g·mm/m²·day) at 37.8° C. and 90% RH. The air permeability of the ink tube 10 is set to 53 (g·mm/m²·day·atm) at 23° C. The compression set of the ink tube 10 is set to 41%.

As described above, the ink tube 10 is obtained by extruding the thermoplastic elastomer composition containing the olefin thermoplastic resin and the butyl rubber, having a low water vapor permeability and a low air permeability, dispersed in the olefin thermoplastic resin by using a dynamic crosslinking method. Therefore the ink tube 10 has a low water vapor permeability and a low air permeability, is flexible, and has superior extrusion characteristic (extruded surface texture). The extrusion method eliminates the need for performing a vulcanizing process after the thermoplastic elastomer composition is extruded, which improves the productivity of the ink tube.

Therefore the ink tube 10 for the ink jet printer can be suitably used to discard waste ink to the outside of an ink head, when the ink head is cleaned and supply ink to the ink head from an ink tank.

In the conventional butyl rubber extrusion method, the extrusion speed thereof is about 0.2 m/minute. After the extrusion stage finishes, it is necessary to perform a vulcanizing stage and then batch treatment. Thus the conventional butyl rubber extrusion method is low in the productivity of the ink tube. However, the thermoplastic elastomer composition of the present invention can be extruded at a speed not less than 2 m/minute, which enhances the production speed. That is, in the extrusion method of the present invention, it is unnecessary to vulcanize the thermoplastic elastomer composition. Thus the extrusion speed is the production speed.

Only the butyl rubber is used as the rubber component in the above-described embodiment. But as the rubber component, it is possible to use a mixture of the butyl rubber and other rubbers such as EPDM. In addition, it is possible to use olefin thermoplastic resins from among polypropylene, polyethylene, and the like.

The rubber component may be dynamically crosslinked with a peroxide. A conventional crosslinking method may be used in combination with the dynamic crosslinking method. The kind of each component and the mixing amount thereof can be selected appropriately in dependence on performance demanded for the ink tube. Further a softener may be used for the thermoplastic elastomer composition to adjust the hardness thereof. The thermoplastic elastomer composition can be produced by methods other than the resin extrusion method.

Examples of the ink tube, of the present invention, for the ink jet printer and comparison examples are described in detail below.

An ink tube of each of the examples and the comparison examples was produced with a dynamically crosslinked thermoplastic elastomer composition containing components each having the mixing ratio shown in table 1.

TABLE 1

| | Rubber component | | Olefin thermoplastic resin | Resinous crosslinking agent | Softener | Hardness | Water vapor permeability | Air permeability | Compression set | Flexibility test |
|---|---|---|---|---|---|---|---|---|---|---|
| | Butyl rubber | EPDM | | | | | | | | |
| CE1 | 100 | 0 | 200 | 12 | 100 | 58 | 0.37 | 20 | 30 | X |
| CE2 | 100 | 0 | 100 | 12 | 50 | 75 | 0.57 | 57 | 51 | ○ |
| E1 | 100 | 0 | 80 | 12 | 50 | 65 | 0.56 | 53 | 41 | ○ |
| E2 | 50 | 50 | 80 | 12 | 50 | 55 | 0.59 | 68 | 33 | ○ |
| E3 | 30 | 70 | 80 | 12 | 50 | 49 | 0.68 | 97 | 26 | ○ |
| CE3 | 20 | 80 | 80 | 12 | 50 | 46 | 0.88 | 121 | 24 | ○ |
| CE4 | 0 | 100 | 80 | 12 | 50 | 43 | 1.19 | 252 | 23 | ○ | where CE denotes comparison example and where E denotes example.
Amount of components is shown by parts by weight
Water vapor permeability unit g · mm/m$^2$ · day at 37.8° C. and 90% RH
Air permeability unit: g · nm/m$^2$ · day · atm at 23° C.

Each ink tube was produced as described below.

After all the components were mixed with one another ith a tumbler, the mixture was kneaded at 200 rpm while it as being heated at 180° C. to 200° C. with a biaxial extruder (HTM38 manufactured by Ibeck Inc.) to dynamically crosslink the rubber component. The obtained thermoplastic elastomer composition was pelletized.

Each pellet was extruded by a mono-axial extruder (Kasamatsu Kako Kenkyusho) at 20 rpm while it was being heated at 190° C. to 230° C. to obtain a tubular ink tube having an outer diameter of φ5 mm and an inner diameter of φ3 mm. The ink tube was cut to a predetermined length of 300 mm.

The detail of the components used is shown below.
Butyl rubber: Butyl-268 produced by JSR Inc.
EPDM rubber: Esprene 670F produced by Sumitomo Kagaku
  rubber(oil-extended rubber):oil=1:1
Olefin resin: polypropylene (BC6 produced by Nippon Polychemical)
Resinous crosslinking agent: Tacky roll produced by Taoka Kagaku
Softener: PW-380 produced by Idemitsu Kosan

EXAMPLES 1 THROUGH 3

A rubber component containing not less than 30 wt % of butyl rubber was dispersed finely by dynamic vulcanization it in a polyolefin thermoplastic resin. The Shore-A-hardness of the obtained thermoplastic elastomer composition was adjusted to be not more than 70.

Comparison Examples 1 through 4

In the ink tube of the comparison example 1, the polyolefin thermoplastic resin was not used, and the butyl rubber was vulcanized.

In the ink tube of the comparison example 2, the Shore-A-hardness was set to not less than 70.

In the ink tube of the comparison example 3, the rubber component contained the smallest amount, namely, 20 wt % of the butyl rubber.

In the ink tube of the comparison example 4, the rubber component did not contain the butyl rubber.

The ink tube of each of the examples and the comparison examples was evaluated on the following items by using methods that will be described later.

Hardness

A load of 500 g was applied to each ink tube at a constant temperature of 23° C. and a constant relative humidity of 55%. The hardness was measured by a Shore-A-hardness meter.

Water Vapor Permeability

The water vapor permeability was measured by ASTM F 1249 test method at 37.8° C. and 90% RH. The unit of g·mm/m$^2$·day was used.

Air Permeability

The air vapor permeability was measured by ASTM F 1434 method 5 at 23° C. The unit of g·mm/m$^2$·day·atm was used.

Flexibility Test

Each ink tube containing a round core having a diameter of 35 mm was kinked with to determine whether the ink tube was clogged with ink. The mark of X was given to the ink tube which was clogged with the ink and made it difficult for the ink to flow inside the ink tube. The mark of O was given to the ink tube not clogged with the ink.

Compression Set

The compression set was measured on a specimen of each of the examples and the comparison examples at 70° C. for 72 hours in accordance with the requirement of "Method of testing the compression set of vulcanized rubber" described in JISK6262. The compression rate was set to 25%.

As shown in table 1, in the ink tube of each of the examples 1 through 3, the rubber component containing not less than 30 wt % of the butyl rubber was dispersed finely by dynamic vulcanization it in the olefin thermoplastic resin. The Shore-A-hardness of the thermoplastic elastomer composition was set to not more than 70. Therefore each ink tube had low water vapor permeability and air permeability and showed a favorable result in the flexibility test. The ink tube had a small value in the compression set and a superior dimensional stability. It was confirmed that the ink tube of each of the examples 1 through 3 had superior performance.

In the ink tube of the comparison example 1, the rubber component consisted of the vulcanized butyl rubber. Thus the ink tube was inferior in its flexibility. Since the ink tube of the comparison example 2 had a high Shore-A-hardness, the ink tube was unsuitable. The ink tube of the comparison examples 3 and 4 had high water vapor permeability and air permeability and were thus unsuitable because the ink tubes of the comparison example 3 contained a small amount of the butyl rubber, and the ink tube of the comparison example 4 did not contain the butyl rubber.

EFFECT OF THE INVENTION

As apparent from the foregoing description, according to the present invention, the ink tube of the present invention has very low water vapor permeability and air permeability. Therefore it is possible to prevent the ink from being set by vaporized water contained in the ink. Further it is possible to prevent oxygen in the air from permeating the ink tube. Thereby it is possible to prevent the ink from being deteriorated by oxidization. Therefore the ink tube has high durability. Further the hardness of the ink tube is set to a low degree to allow it to be flexible. Thus even if the ink tube deforms, it is possible to keep the ink flow smoothly and there is little restriction in the disposing form of the ink tube inside an ink jet recording apparatus. That is, the ink tube can be used as a general-purpose ink tube. Since the ink tube has a one-layer structure and is capable of realizing these performances, the ink tube can be produced at a high efficiency.

Since it is possible to form the thermoplastic elastomer composition by the resinous extrusion method, the thermoplastic elastomer composition has a smooth surface and can be produced at a high productivity. Thus the resinous extrusion method is capable of producing the thermoplastic elastomer composition having the above-described high performance for the ink tube.

Accordingly the ink-transporting ink tube connected with the ink head can be suitably used for the ink jet printer. That is, the ink tube can be used to discard waste ink to the outside of the ink head when the ink head is cleaned and supply the ink from the ink tank to the ink head.

What is claimed is:

1. An ink tube for an ink jet printer formed by using a thermoplastic elastomer composition, having a Shore-A-hardness of not more than 70, which comprises an olefin thermoplastic resin and a rubber component, containing not less than 30 wt % of butyl rubber, which is dispersed finely by dynamic vulcanization said rubber component in said olefin thermoplastic resin.

2. The ink tube according to claim 1, wherein said thermoplastic elastomer composition is shaped a tube by a resin extrusion method.

3. The ink tube according to claim 2, wherein a weight ratio between said thermoplastic elastomer composition and said rubber component is 4:1 to 1:4.

4. The ink tube according to claim 3, wherein water vapor permeability is not more than 1.0 (g·mm/m$^2$·day) at 37.8° C. and 90% RH; and air permeability is not more than 100 (g·mm/m$^2$·day·atm) at 23° C.

5. The ink tube according to claim 3, wherein as said rubber component, butyl rubber is used singly or a mixture of said butyl rubber and EPDM is used; and as said olefin thermoplastic resin, one or more resins selected from among polypropylene and polyethylene are used.

6. The ink tube according to claim 2, wherein water vapor permeability is not more than 1.0 (g·mm/m$^2$·day) at 37.8° C. and 90% RH; and air permeability is not more than 100 (g·mm/m$^2$·day·atm) at 23° C.

7. The ink tube according to claim 2, wherein as said rubber component, butyl rubber is used singly or a mixture of said butyl rubber and EPDM is used; and as said olefin thermoplastic resin, one or more resins selected from among polypropylene and polyethylene are used.

8. The ink tube according to claim 1, wherein a weight ratio between said thermoplastic elastomer composition and said rubber component is 4:1 to 1:4.

9. The ink tube according to claim 8, wherein water vapor permeability is not more than 1.0 (g·mm/m$^2$·day) at 37.8° C. and 90% RH; and air permeability is not more than 100 (g·mm/m$^2$·day·atm) at 23° C.

10. The ink tube according to claim 8, wherein as said rubber component, butyl rubber is used singly or a mixture of said butyl rubber and EPDM is used; and as said olefin thermoplastic resin, one or more resins selected from among polypropylene and polyethylene are used.

11. The ink tube according to claim 1, wherein water vapor permeability is not more than 1.0 (g·mm/m$^2$·day) at 37.8° C. and 90% RH; and air permeability is not more than 100 (g·mm/m$^2$·day·atm) at 23° C.

12. The ink tube according to claim 11, wherein as said rubber component, butyl rubber is used singly or a mixture of said butyl rubber and EPDM is used; and as said olefin thermoplastic resin, one or more resins selected from among polypropylene and polyethylene are used.

13. The ink tube according to claim 1, wherein as said rubber component, butyl rubber is used singly or a mixture of said butyl rubber and EPDM is used; and as said olefin thermoplastic resin, one or more resins selected from among polypropylene and polyethylene are used.

* * * * *